July 31, 1962     W. J. DORNHOEFER     3,047,736
TRANSISTOR SWITCHING AMPLIFIER
Filed Dec. 2, 1957
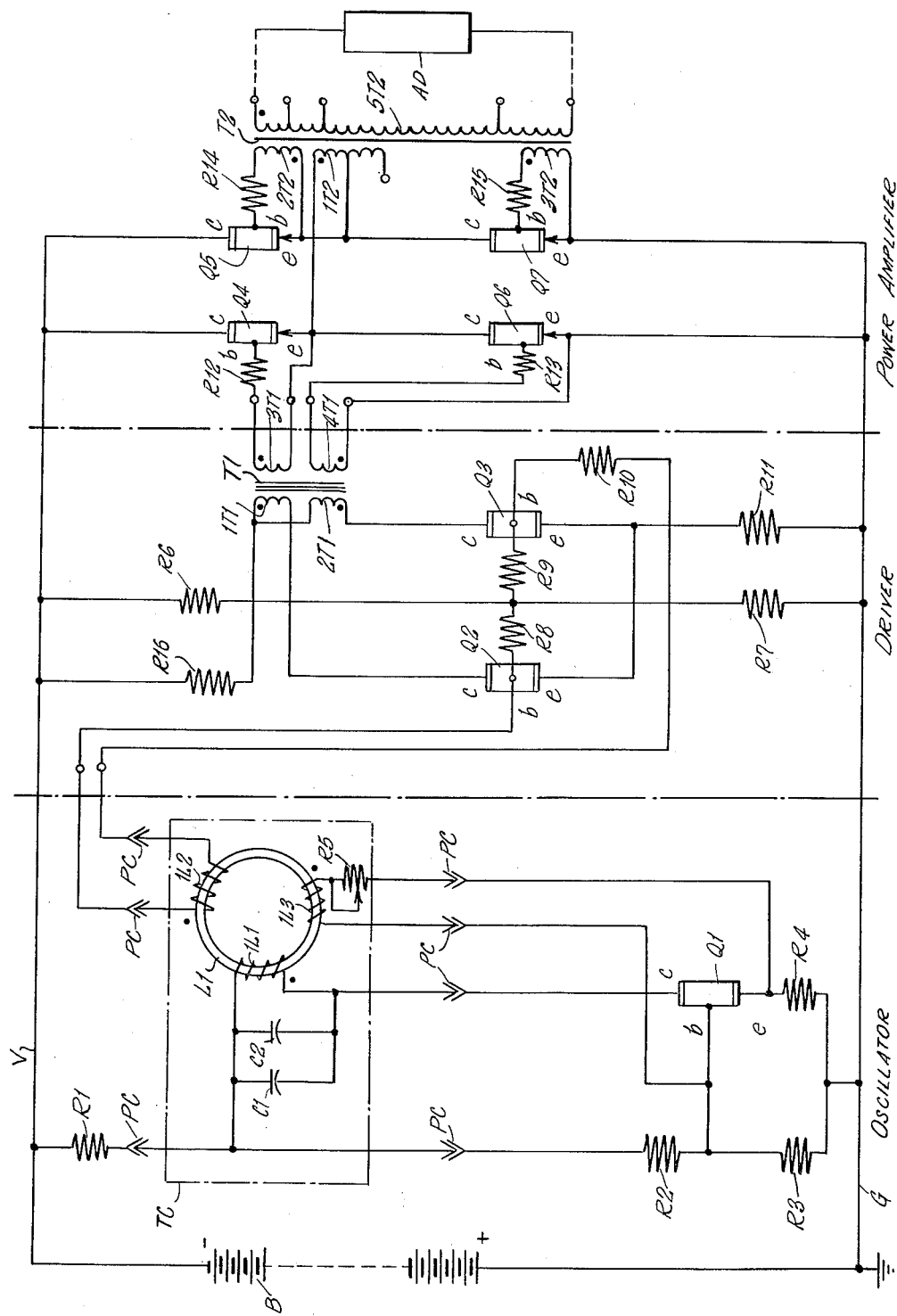

United States Patent Office  3,047,736
Patented July 31, 1962

3,047,736
TRANSISTOR SWITCHING AMPLIFIER
Warren J. Dornhoefer, Groton, Mass., assignor to The Warren Manufacturing Company, Inc., Littleton, Mass., a corporation of Massachusetts
Filed Dec. 2, 1957, Ser. No. 700,147
4 Claims. (Cl. 307—88.5)

My invention relates to electric oscillation generators and, in a more specific aspect, to ringing generators for the selective operation, in telephone and other telecommunication systems, of electromagnetic bells or the like devices of relatively low operating frequency, for instance between about 16 and about 66 cycles per second.

The ringing generators heretofore available for such purposes can be classified in: (1) dynamo-electric motor-generator sets, (2) static sub-harmonic generators, (3) electronic-tube multi-vibrators, and (4) mechanical vibrators.

Aside from mechanical vibrators, the efficiency of the known ringing generators is low, being about 35% for dynamo-electric machine sets; 20% for electronic sets and from 11% to 42% for subharmonic sets. Subharmonic generators as well as electronic sets require connection to a commercial power line as well as a stand-by power supply to operate in the event of a commerical power failure. Electronic multi-vibrators as well as sub-harmonic generators cannot be operated from the central office battery of an exchange. Furthermore, most of the known types of ringing generators may become damaged if the output is overloaded or shortcircuited by misuse or accident.

It is an object of my invention to provide an electric oscillation generator formed exclusively by static and hence mechanically insensitive components that requires a minimum of maintenance, that combines small size and small weight with high efficiency, particularly in comparison with dynamo electric generators and sub-harmonic generators, and that can be operated from a central battery and is safe from damage by overloading or short-circuiting of the generator output.

These and other objects and advantages of the invention as well as the novel features by virtue of which they are achieved, these features being set forth with particularity in the claims annexed hereto, will be apparent from, and will be mentioned in, the following description with reference to the drawing showing, by way of example, a schematic circuit diagram of a ringing generator according to the invention.

In the following description of the ringing generator illustrated on the drawing, correlated numerical examples of electric parameter values are given in parentheses; but it should be understood that these values are presented only by way of example and may be modified, in proper correlation to one another, depending upon the requirements or preferences of any particular application. With reference to the parenthetical values, all resistors may be rated for approximately 0.5 watt, with the exception of resistor R9 which may be rated for 1 watt. The transistors Q1 to Q7 of the illustrated generator consist preferably of junction-type transistors, such as p-n-p germanium transistors. The collector electrode of each transistor is denoted by $c$, the emitter electrode by $e$ and the base electrode by $b$.

The ringing generator essentially comprises three sequential transistor stages designated on the drawing as Oscillator, Driver and Power Amplifier and hereinafter described in the sequence just given.

The generator system is energized from a source B of constant direct current (48 volts), preferably a central-office battery. The negative pole, which may be grounded, is connected to a direct-current bus G. The positive pole is connected to a direct-current bus V.

The oscillator stage of the generator receives voltage from a voltage divider formed by three resistors R1 (3900 ohms), R2 (2700 ohms), and R3 (2700 ohms), connected in series between buses V and G. The base $b$ of the oscillator transistor Q1 is connected to a circuit point between resistors R2 and R3. The emitter $e$ of transistor Q1 is grounded through a resistor R4 (4700 ohms) connected to bus G. The collector circuit of transistor Q1, extending from collector electrode $c$ to a circuit point between resistors R1 and R2, includes a tank circuit composed of two capacitors C1 (3.3 mfd.), C2 (0.67 mfd.), and an inductance coil 1L1 (25 henry; the tank circuit parameters are given for 16 c.p.s.). The inductance coil has a toroidal iron core L1 preferably made of powdered Permalloy and having a substantially linear characteristic. The core carries two secondary windings 1L2 and 1L3. Winding 1L3 is feedback-connected between the base $b$ and the emitter $e$ of transistor Q1 through an adjustable resistor R5 (330 ohms, for 16 c.p.s.). The oscillator output is supplied by winding 1L2 to the input terminals of the driver stage.

The tank circuit components C1, C2, L1 and resistor R5 are combined to a unit denoted by TC which is shielded by its own can, and is connected with the other components of the ringing generator by a multiple plug connection whose individual plug-and-socket pairs are denoted by PC. Thus, the generator frequency can be changed simply by exchanging the unit TC for one of different tuning.

The driver stage is essentially a constant sum-current differential amplifier. The input signal from winding 1L2 is supplied to the base $b$ of a transistor Q2 and, through a resistor R10 (1500 ohms), also to the base $b$ of a transistor Q3, the bases of the two transistors are connected through respective resistors R8 (1200 ohms) and R9 (1200 ohms) to the mid-point of a voltage divider formed by two resistors R6 (10,000 ohms) and R7 (10,000 ohms) extending in series across buses V and G. The emitter of transistors Q2, Q3 connects through the common resistor R11 to the positive direct-current bus G. The collector circuits of the transistors Q2 and Q3 include respective primary windings 1T1 and 2T1 of a coupling transformer T1 in series with a resistor R16 (680 ohms). The output of the driver amplifier appears at the secondary windings 3T1 and 4T1 of transformer T1. The signal provided by the secondary 1L2 of inductance coil 1L1 is sufficient to cause saturation of the driver amplifier transistors Q2 and Q3. Therefore, the voltage of the secondary windings 3T1 and 4T1 of the driver output transformer T1 is limited and is more square than sinusoidal.

The power amplifier stage of the generator system comprises four power transistors Q4, Q5, Q6, Q7 and a power transformer T2 with a primary winding 1T2, two secondary feedback windings 2T2, 3T2 and a multi-tap output secondary 5T2. The transistors Q4 and Q6 are driven by the driver stage. For this purpose the base $b$ of transistor Q4 is connected through a resistor R12 (47 ohms) with the secondary winding 3T1 of the driver output transformer T1; and the base of transistor Q6 is connected through a resistor R13 (47 ohms) to the secondary 4T1 of the same transformer. The two other transistors Q5 and Q7, however, are driven from the two feedback windings 2T2 and 3T2 of the power output transformer T2 and for this purpose have their respective base-emitter circuits energized from windings 2T2 and 3T2 through respective resistors R14 (47 ohms) and R15 (47 ohms). The output transformer T2 has its secondary winding 5T2 subdivided into a desired number of voltage steps so that, for instance, any desired voltage between 5 and 140 volts may be taken off and applied to the bell or other device AD to be operated. The output transformer is preferably a universal transformer which provides all of the available voltages at all of the frequencies normally used for ringing purposes. Thus, one transformer can be used for 15 different frequencies, depending upon the frequency tuning of the particular oscillator unit being used, thus considerably simplifying the required amount of equipment. The drawing includes conventional polarity markings for the windings in the device for further elucidation. In accordance with A.I.E.E. convention, one end of the windings of a transformer is dotted to indicate which respective ends of the windings correspond to each other in polarity at any time.

The performance and coaction of the generator components in the above-described system as well as the novel features of the invention will now be described more in detail.

In operation a signal may be traced from the oscillator Q1 for the positive half cycle. A positive polarity on the dot side of winding 1L1 is assumed as a result of the natural tendency to oscillate with capacitors C1 and C2. The dot side of 1L3 is thus also positive and causes current to flow in the emitter-base junction of transistor Q1. The current direction is such as to turn On Q1, which causes the dot side of 1L1 to be still more positive, thereby reinforcing and sustaining the tendency to oscillate.

The current induced in winding 1L2 causes the dot side of winding 1L2 to be positive and causes current to flow through resistor R10 and thence to two parallel paths. The first of these paths is through R8 and R9, and second of these paths is through the base to emitter of Q2 and through emitter to base of Q3. The base current is such as to turn transistor Q2 Off and Q3 On, and is of sufficient magnitude to cause saturation of the "On" transistor (Q3) within the first ten to twenty degrees of sine wave voltage on winding 1L2.

With Q3, On, the dot side of winding 2T1 assumes a relatively positive polarity compared to R11 (neglecting the saturation drop of transistor Q3, while the no-dot side retains the more negative polarity of R16. The polarity at the dot side of 1T1 occurs by induction since Q2 may be regarded as an open circuit.

Transistor Q4 is turned Off by the polarity of the voltage in winding 3T1 while transistor Q6 is turned On and saturated by the voltage induced into winding 4T1.

Saturation of transistor Q6 and the subsequent low resistance thereof causes the voltage on the dot side of winding 1T2 to approach the value of the bus G which is the positive side of the battery B. The no-dot side of the winding 1T2 initially had negative polarity due to the leakage currents in transistors Q5 and Q7, that is the voltage of the no-dot side of winding 1T2 was determined substantially by the initially high leakage impedances of the transistors Q5 and Q7 which form a voltage divider across the buses. The change in voltage of the dot side of winding 1T2, regardless of the magnitude of the initial voltage, induces voltages in windings 2T2 and 3T2. From the polarities indicated by the dots of these windings, it will be seen that current will flow from emitter to base of Q5 and will turn On transistor Q5 whereas transistor Q7 will be turned Off. This will cause the voltage on the no-dot side of winding 1T2 to approach the full negative battery voltage at bus V since the ratio of leakage currents and impedances of Q5 and Q7 now approach the infinite.

When the polarity of the oscillator containing Q1 is reversed, the dotted polarities are negative.

The oscillator in the generator system must hold the desired frequency as accurately as is economically feasible. As described, the oscillator tank circuit C1, C2, 1L1 is connected as a parallel-resonance coil-capacitor combination in the collector circuit of the oscillator transistor Q1; and an additional winding 1L3 on the inductance coil of the tank circuit supplies the emitter-to-base voltage required for sustaining the operation of the oscillator; whereas another isolated winding 1L2 of the same inductance coil furnishes the voltage to drive the next stage of the generator system.

The principal characteristics of this oscillator are its freedom from reactive components other than those that determine the frequency; and its good frequency stability obtained in spite of a very low quality factor (Q) of the toroidal inductor used.

Compared with conventional oscillators, the one used in the ringing generator according to the invention eliminates several components which would cause frequency changes by themselves, and it also differs from conventional oscillators in obtaining excellent frequency stability with the aid of an inductance coil of very low quality factor (Q), thus achieving a result contrary to that expected from the conventional oscillator theory according to which an oscillator, for frequency stability, is supposed to always require a high Q value, that is, a loaded Q value of the tank circuit above that of a corresponding class-C amplifier, and according to which any variation in the reactive component of the coupled impedance is expected to alter the resonant frequency of the tank circuit and hence to produce corresponding changes in the generated frequency. In addition, when accurate frequency is required, the plate supply voltages are usually regulated or stabilized in order to minimize the frequency effect of changes in these parameters. Often too, an effort is made to make the coupling capacitors between the oscillator and the load very large so that their reactance is low and the phase shift to be developed by the resonant circuit is small.

The conventional factors above mentioned are sidestepped by the oscillator of the ringing generator according to the invention. This is done by completely eliminating the coupling capacitors either in the feedback or the load connection. All of the components in the oscillator stage, except the frequency determining components, are either resistors or the transistor elements. Thus, contrary to conventional oscillators, there is nothing in the oscillator stage of this generator to require development of a phase shift or off-resonance operation by the tank circuit. The requisite 360° phase shift is rather provided by the 180° phase shift of the transistor itself, and a 180° phase shift of the feedback winding 1L3 made simply by means of appropriate connections. The transistor capacitances are the only capacitances which are present in the circuit in addition to those of the frequency determining components. That is, while the capacitance of the frequency determining components C1, C2 may be between 2 and 5 microfarads in all of the oscillators required for all ringing frequencies, the parallel capacitance introduced by the transistor Q1 ($35 \cdot 10^{-6}$ mfd.) is only in the order of $\frac{1}{100,000}$ of the tank circuit capacitance. Hence, the only other capacitance present in the oscillator circuit may be neglected as well as any changes of that capacitance which might otherwise alter the oscillation frequency.

As mentioned, the conventional oscillator theory indicates that, for good frequency stability, the quality factor (Q) of the tank circuit inductance must be high. At the very low frequencies involved in ringing generators, that is 16 to 66 cycles, this is extremely difficult to obtain. For example, the Q values of the coils actually used in the oscillators of ringing generators made according to the invention, vary from 2.5 at 16 cycles to 9.9 at 66⅔ cycles. These Q values would be considered, by conventional theory, as too low and unsuitable for constant frequency performance. However, since the oscillator does not have to develop a reactive component of voltage in order to stay in oscillation, an excellent frequency stability is obtained with these low Q coils. Measured results of the coil with the lowest Q value at 16 cycles have shown that the 16 cycle frequency is held constant within .04 cycle for direct-current input voltage variations from 44 to 52 volts and for temperature variations from 79° to 146° F. Actually, since with the kind of oscillator circuit according to the invention, there is no requirement for development of a reactive or phase shift voltage, the important factor for frequency stability is constancy of inductance against changes in temperature, current level and voltage level, rather than a high quality factor.

Conventional oscillators develop frequency changes when the tube or transistor parameters change due to changes of supply voltage, aging, and other factors. Such frequency changes arise from the phase shift which results from the fact that the oscillator circuit includes additional capacitances of a similar order of magnitude as the tank-circuit capacitances. That is, the additional capacitances, such as those of blocking, coupling or bypass capacitors develop reactive voltages and hence cause phase variations.

In contrast, changes in level of oscillation or of supply voltage or collector current will not affect oscillator frequency of a generator according to the invention, except to the extent as they may cause a change in inductance of the tank-circuit coil 1L1. For this reason, the oscillation generator does not develop an excessive frequency shift when the supply voltage is changed, nor when the temperature is changed, if a suitable powdered-Permalloy or other linear-characteristic material is employed for the core of inductance member 1L.

As mentioned above, the driver stage of the ringing-generator system derives its signal from a resistively coupled voltage supplied by winding 1L2 on the inductance coil L1 of the oscillator tank circuit. This circuit connection does not introduce any phase shift into the oscillator and thus preserves the constancy of the oscillator frequency although it provides adequate voltage to drive the push-pull driver stage. The driver stage as such is essentially conventional except that it is preferable for the purpose of the invention to obtain a somewhat square voltage wave in windings 1T1 and 2T1 of transformer T1 by virtue of the fact that the signal voltage from transformer winding 1L2 is sufficient to cause saturation of the transistors Q2 and Q3 as described above.

The power amplifier stage of the system is essentially a push-pull amplifier which energizes the primary 1T2 of the power transformer T2 from buses V and G with alternate polarities. The four power transistors Q4 and Q7 operate as switches with the effect that the primary 1T2 of transformer T2 is symmetrically switched at the ringing-frequency rate across the direct current buses V, G and receives a square-wave voltage whose amplitude is substantially the direct-current bus voltage (±48 volts). It is well known that switching-transistor amplifiers are extremely efficient and have very small dissipation in the switching transistors since there is collector current when there is collector voltage, and there is no collector voltage when there is collector current. The circuit connection shown for the power stage is not a conventional push-pull circuit. It rather uses four transistors, two being driven by the driver stage and the other two by the feedback windings 2T2 and 3T2 on transformer T2. The power-amplifier stage might be operated by four isolated secondaries on transformer T1 and would then provide satisfactory ringing voltage under normal circumstances. However, if under these conditions the output is shorted, the transistors continue to be switched on alternately although now the transformer cannot develop any reactive voltage. This would cause considerable power loss in the four power transistors Q4 to Q7 and hence decrease efficiency. Also, more than the full-load input current would be drawn from the line whenever the output was overloaded or short-circuited, thus damaging or destroying the transistors.

By comparison, the power amplifier shown on the drawing is virtually short-circuit proof because, if the output transformer T2 is short-circuited, the feedback voltages no longer appear at the secondaries 2T2, 2T3 of this transformer, and the operation of the switching transistor amplifier ceases. In this case, the only current drawn from the buses V, G by the power amplifier is the no-signal grounded-emitter collector current of transistors Q5 and Q7, which is a very small quantity. Transistors under this short-circuit condition operate cool, being at virtually no load. The short circuit can be maintained indefinitely, and normal operation commences immediately upon its removal. The values of the resistors R14, R15 in the feedback circuits of transformer T2 can be adjusted so that the collapse of the output voltage occurs at any desired value of overload, such as at 110%, 150%, 200% or any other amount of the rated full-load current.

Considering the ringing generator according to the invention, as a whole in comparison with those heretofore available, the invention affords various other advantages.

In the first place, the efficiency of the generator according to the invention is much higher than that obtainable with dynamo-electric generators, sub-harmonic generators, and electronic multivibrators. Depending on each particular application, the efficiency of the transistor generator according to the invention is approximately 70 to 85%, and generally in the neighborhood of 75%. This is approximately twice as high as the efficiency obtainable with the above-mentioned known dynamo-electric and mechanical devices. While in this respect a mechanical vibrator may attain similarly high efficiency, a transistor generator according to the invention has no moving or vibrating parts. In addition, a ringing generator according to the invention has smaller size and weight than dynamo electric machinery and, in this respect, is also smaller than mechanical vibrator units and electronic multi-vibrators while securing a reliable, completely silent operation without mechanically moving parts and without sensitive electronic tubes. Another advantage of the generator according to the invention is that it operates directly from the central-office battery and requires no source of 60 cycle power, either normal or standby, as is required by the electronic and subharmonic unit.

Another advantage of the invention over the known devices is the fact, explained above, that the output of the ringing generator can be short-circuited without damaging the generator and without drawing excessive current either in the input or output circuits.

A further advantage of the ringing generator according to the invention is its versatility relative to its use for different ringing frequencies. In many cases five different ringing frequencies are desired. For such purposes, it is merely necessary to provide several tank-circuit units TC differing from one another only in frequency tuning, while all other components, including the driver and power-amplifier sections, are the same for all frequencies, thus made available. The driver and power-amplifier components are preferably combined with the transistor circuit of the oscillator stage so as to form a single main unit which is equipped with a plug-in connector; and the tank circuit, as described, is formed as a separate sub-assembly which can readily be plugged into the main unit. The main unit is provided with fastening means for mounting it on a rack, whereas the tank-circuit assembly is mounted only by plugging it into the main circuit. Hence, in an existing installation a change from one to another ringing frequency can readily be made by exchanging the tank-circuit assembly.

The wave form of the generator output is essentially a square wave particularly suitable for supplying optimum ringing power to an electromagnetic bell for a given value of peak voltage which is a consideration in insulation protection and safety. A square wave voltage of this kind with a value of 100 volts, for instance, supplies as much electromagnetic energy to the armature of the bell as a sine-wave voltage of 157 volts peak value.

It will be apparent to those skilled in the art upon study of this disclosure that ringing generators according to my invention can be modified with respect to individual components and circuitry without departing from the essential features of my invention and within the scope of the claims annexed hereto.

I claim:
1. A transistor switching amplifier comprising two direct-current buses for supplying energizing current, two pairs of junction-type switching transistors each having the respective collector-emitter circuits of its two transistors serially connected with an intermediate collector-emitter connection extending between the two transistors, each pair of said serially connected transistors being connected across said two buses and all four transistors having the same poling relative to said two buses, each of said four transistors having an emitter-base control circuit, a signal input transformer having a primary signal circuit means and having two secondary windings connected in said respective control circuits of the two transistors of one of said pairs for alternate switching thereof, an output transformer having a primary winding connected across said intermediate collector-emitter connections and having a secondary main winding to furnish square-wave output current and two secondary feedback windings connected in said respective other two control circuits for current limit control, whereby the switching amplifier is protected from damage due to excessive output current.

2. A switching amplifier comprising a bridge network having two direct-current buses of respectively different polarities and two pairs of controllable junction-type semiconductor switching devices, each of said devices having anodic and cathodic main electrodes and having a control electrode between said two main electrodes, the two semiconductor devices of each pair having respective main-electrode circuits serially connected with an intermediate anode-cathode connection extending between said two devices, each pair of serially connected semiconductor devices being connected across said two buses and all four devices having the same poling relative to said buses, each of said four semiconductor devices having a control circuit extending between its control electrode and one of its main electrodes, control voltage supply means for applying control voltage to said four control circuits comprising an input transformer having primary signal circuit means and having two secondary windings connected in said respective control circuits of the two semiconductor devices of one of said pairs for alternate switching thereof, an output transformer having a primary winding connected across said two intermediate connections and having a secondary main winding to furnish square-wave output current and secondary winding means feedback-connected with said network for current limit control whereby the amplifier is protected from damage due to excessive output current.

3. A switching amplifier comprising a bridge network having two direct-current buses of respectively different polarities and two pairs of controllable junction-type semiconductor switching devices, each of said devices having anodic and cathodic main electrodes and having a control electrode between said two main electrodes, the two semiconductor devices of each pair having respective main-electrode circuits serially connected with an intermediate anode-cathode connection extending between said two devices, each pair of serially connected semiconductor switching devices being connected across said two buses and all four devices having the same poling relative to said buses, each of said four semiconductor devices having a control circuit extending between its control electrode and one of its main electrodes, a signal input transformer having primary signal circuit means and having two secondary windings connected in said respective control circuits of the two semiconductor devices of one of said pairs for alternate switching thereof, an output transformer having a primary winding connected across said two intermediate connections and having a secondary main winding to furnish square-wave output current and two secondary feedback windings connected in said respective other two control circuits for current limit control, whereby the switching amplifier is protected from damage due to excessive output current.

4. A transistor switching amplifier comprising two direct-current buses for supplying energizing current, two pairs of junction-type switching transistors each having the respective collector-emitter circuits of its two transistors serially connected with an intermediate collector-emitter connection extending between the two transistors, each pair of said serially connected transistors being connected across said two buses and all four transistors having the same poling relative to said two buses, each of said four transistors having an emitter-base control circuit, a signal input transformer having primary signal circuit means and having two secondary windings connected in said respective control circuits of the two transistors of one of said pairs for alternate siwtching thereof, an output transformer having a primary winding connected across said intermediate collector-emitter connections and having a secondary main winding to furnish square-wave output current and two secondary feedback windings, and two resistors connected in series with said respective feedback windings in said other two control circuits respectively, whereby the amplifier is controlled by feedback voltage to cease operating when the output current exceeds a limit depending upon the resistance of said two resistors.

References Cited in the file of this patent
UNITED STATES PATENTS

| | | |
|---|---|---|
| 2,536,641 | Haynes | Jan. 2, 1951 |
| 2,547,338 | Morrison | Apr. 3, 1951 |
| 2,666,818 | Shockley | Jan. 19, 1954 |
| 2,667,632 | Grandstaff | Jan. 26, 1954 |
| 2,761,917 | Aronson | Sept. 4, 1956 |
| 2,784,262 | Crow | Mar. 5, 1957 |
| 2,791,645 | Bessey | May 7, 1957 |
| 2,804,547 | Mortimer | Aug. 27, 1957 |
| 2,811,643 | Eberhard | Oct. 29, 1957 |
| 2,821,639 | Bright et al. | Jan. 28, 1958 |
| 2,835,748 | Ensink et al. | May 20, 1958 |
| 2,862,171 | Freeborn | Nov. 25, 1958 |